US009128873B2

(12) United States Patent
Foster, Sr. et al.

(10) Patent No.: US 9,128,873 B2
(45) Date of Patent: *Sep. 8, 2015

(54) MEMORY BUS ATTACHED INPUT/OUTPUT ('I/O') SUBSYSTEM MANAGEMENT IN A COMPUTING SYSTEM

(71) Applicant: LENOVO ENTERPRISE SOLUTIONS (SINGAPORE) PTE. LTD., Singapore (SG)

(72) Inventors: Jimmy G. Foster, Sr., Morrisville, NC (US); Sumeet Kochar, Apex, NC (US); Randolph S. Kolvick, Durham, NC (US); Makoto Ono, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 25 days.

This patent is subject to a terminal disclaimer.

(21) Appl. No.: 13/729,599

(22) Filed: Dec. 28, 2012

(65) Prior Publication Data

US 2014/0189164 A1    Jul. 3, 2014

Related U.S. Application Data

(63) Continuation of application No. 13/729,496, filed on Dec. 28, 2012.

(51) Int. Cl.
*G06F 3/00* (2006.01)
*G06F 13/24* (2006.01)
*G06F 13/00* (2006.01)
*G06F 13/12* (2006.01)
*G06F 13/32* (2006.01)

(52) U.S. Cl.
CPC ............ *G06F 13/12* (2013.01); *G06F 13/32* (2013.01)

(58) Field of Classification Search
None
See application file for complete search history.

(56) References Cited

U.S. PATENT DOCUMENTS

| 5,706,407 | A | * | 1/1998 | Nakamura et al. | 700/251 |
| 5,708,820 | A | * | 1/1998 | Park et al. | 713/323 |
| 7,350,044 | B2 | | 3/2008 | Keays | |
| 2004/0128569 | A1 | * | 7/2004 | Wyatt et al. | 713/300 |
| 2007/0006000 | A1 | * | 1/2007 | Jain et al. | 713/300 |
| 2007/0047300 | A1 | | 3/2007 | Lee et al. | |
| 2008/0084756 | A1 | | 4/2008 | Shen et al. | |

(Continued)

OTHER PUBLICATIONS

Viking Technology, "Viking Technology Non-Volatile DIMM (ArxCis-NV™)", URL: http://www.vikingmodular.com/products/arxcis/arxcis.html, accessed Jul. 16, 2012, 2 pages.

(Continued)

*Primary Examiner* — Michael Sun
(74) *Attorney, Agent, or Firm* — Edward J. Lenart; Katherine S. Brown; Kennedy Lenart Spraggins LLP

(57) ABSTRACT

Memory bus attached Input/Output ('I/O') subsystem management in a computing system, the computing system including an I/O subsystem communicatively coupled to a memory bus, including: detecting, by an I/O subsystem device driver, a hibernation request; setting, by the I/O subsystem device driver, a predetermined memory address to a value indicating that the I/O subsystem is not to service system requests; detecting, by the I/O subsystem device driver, that the I/O subsystem device driver has been restarted; and setting, by the I/O subsystem device driver, the predetermined memory address to a value indicating that the I/O subsystem can resume servicing system requests.

7 Claims, 5 Drawing Sheets

(56) References Cited

U.S. PATENT DOCUMENTS

2010/0174934 A1* 7/2010 Zhao et al. .................... 713/324
2012/0124294 A1* 5/2012 Atkisson et al. .............. 711/135
2013/0031341 A1* 1/2013 Ganti et al. ....................... 713/2

OTHER PUBLICATIONS

Russell, "Linux-Kernel Archive: Re: [PATCH 00/11] virtio: Support for hibernation (S4)", URL: http://lkml.indiana.edu/hypermail/linux/kernel/1110.0/00979.html, accessed Jul. 16, 2012, 2 pages.

* cited by examiner

MEMORY BUS ATTACHED INPUT/OUTPUT ('I/O') SUBSYSTEM MANAGEMENT IN A COMPUTING SYSTEM

CROSS-REFERENCE TO RELATED APPLICATION

This application is a continuation application of and claims priority from U.S. patent application Ser. No. 13/729,496, filed on Dec. 28, 2012.

BACKGROUND OF THE INVENTION

1. Field of the Invention

The field of the invention is data processing, or, more specifically, methods, apparatus, and products for memory bus attached Input/Output ('I/O') subsystem management in a computing system.

2. Description Of Related Art

Modern computing systems include an increasing number of processors, slots for memory modules, and memory channels. Modern computing systems also include a limited number of I/O channels. As such, some modern computing systems may be able to incorporate devices that would previously be coupled to an I/O channel to a memory channel instead. By coupling such devices to a memory channel, modern computing systems may take advantage of the increase in speed of a memory channel relative to an I/O channel.

SUMMARY OF THE INVENTION

Methods, apparatus, and products for memory bus attached Input/Output ('I/O') subsystem management in a computing system, the computing system including an I/O subsystem communicatively coupled to a memory bus, including: detecting, by an I/O subsystem device driver, a hibernation request; setting, by the I/O subsystem device driver, a predetermined memory address to a value indicating that the I/O subsystem is not to service system requests; detecting, by the I/O subsystem device driver, that the I/O subsystem device driver has been restarted; and setting, by the I/O subsystem device driver, the predetermined memory address to a value indicating that the I/O subsystem can resume servicing system requests.

The foregoing and other objects, features and advantages of the invention will be apparent from the following more particular descriptions of example embodiments of the invention as illustrated in the accompanying drawings wherein like reference numbers generally represent like parts of example embodiments of the invention.

BRIEF DESCRIPTION OF THE DRAWINGS

FIG. 1 sets forth a block diagram of automated computing machinery comprising an example computing system useful in Input/Output ('I/O') subsystem management according to embodiments of the present invention.

FIG. 2 sets forth a flow chart illustrating an example method for memory bus attached I/O subsystem management in a computing system according to embodiments of the present invention.

FIG. 3 sets forth a flow chart illustrating an example method for memory bus attached I/O subsystem management in a computing system according to embodiments of the present invention.

FIG. 4 sets forth a flow chart illustrating an example method for memory bus attached I/O subsystem management in a computing system according to embodiments of the present invention.

FIG. 5 sets forth a flow chart illustrating an example method for memory bus attached I/O subsystem management in a computing system according to embodiments of the present invention.

DETAILED DESCRIPTION OF EXAMPLE EMBODIMENTS

Example methods, apparatus, and products for memory bus attached Input/Output ('I/O') subsystem management in a computing system in accordance with the present invention are described with reference to the accompanying drawings, beginning with FIG. 1. FIG. 1 sets forth a block diagram of automated computing machinery comprising an example computing system (202) useful in I/O subsystem management according to embodiments of the present invention. The computing system (202) of FIG. 1 includes at least one computer processor (156) or 'CPU' as well as random access memory (168) ('RAM') which is connected through a high speed memory bus (166) and bus adapter (158) to processor (156) and to other components of the computing system (202).

The computing system of FIG. 1 also includes an I/O subsystem (218) that is communicatively coupled to the memory bus (166). In the example of FIG. 1, the I/O subsystem (218) may be embodied, for example, as dual in-line memory module ('DIMM') form factor flash memory ('Flash DIMM'). Flash DIMM, as the term is used here, refers to flash memory that takes the form factor of a DIMM, such that the Flash DIMM may be inserted in a DIMM slot and may communicate with the computer processor over a memory bus that is typically used to connect the computer processor to main memory.

Stored in RAM (168) is an I/O subsystem device driver (206). The I/O subsystem device driver (206) of FIG. 1 is a computer program that controls a particular type of device that is attached to the computing system (202). In particular, the I/O subsystem device driver (206) of FIG. 1 controls the I/O subsystem (218). Consider the example with the I/O subsystem (218) is a Flash DIMM. In such an example, the DIMM includes flash memory that is addressed and accessed in a different way than RAM. The Flash DIMM, however, is inserted into a DIMM slot and is connected to the memory bus (166) as if the Flash DIMM were RAM (168). In order to access the flash memory on such a Flash DIMM, a special purpose device driver would be needed that can communicate with flash memory over the memory bus (166) that connects a processor (156) to RAM (168).

The I/O subsystem device driver (206) of FIG. 1 can carry out I/O subsystem management by detecting a hibernation request. A hibernation request represents a command issued by the operating system (204) to place the computing system (202) into hibernation. Hibernation, as the term is used here, is a state in which the computing system (202) is powered down, but the state of the computing system (202) is retained. When entering into hibernation, the contents of main memory are typically stored into hard disk, so that the state of the computing system (202) can be restored when the computing system (202) resumes operation in a powered-up state. Detecting a hibernation request may be carried out, for example, by the I/O subsystem device driver (206) receiving the request from the operating system (204), by the I/O subsystem device driver (206) listening for the request over a communications channel, and in other ways as will occur to those of skill in the art.

Figure 1:
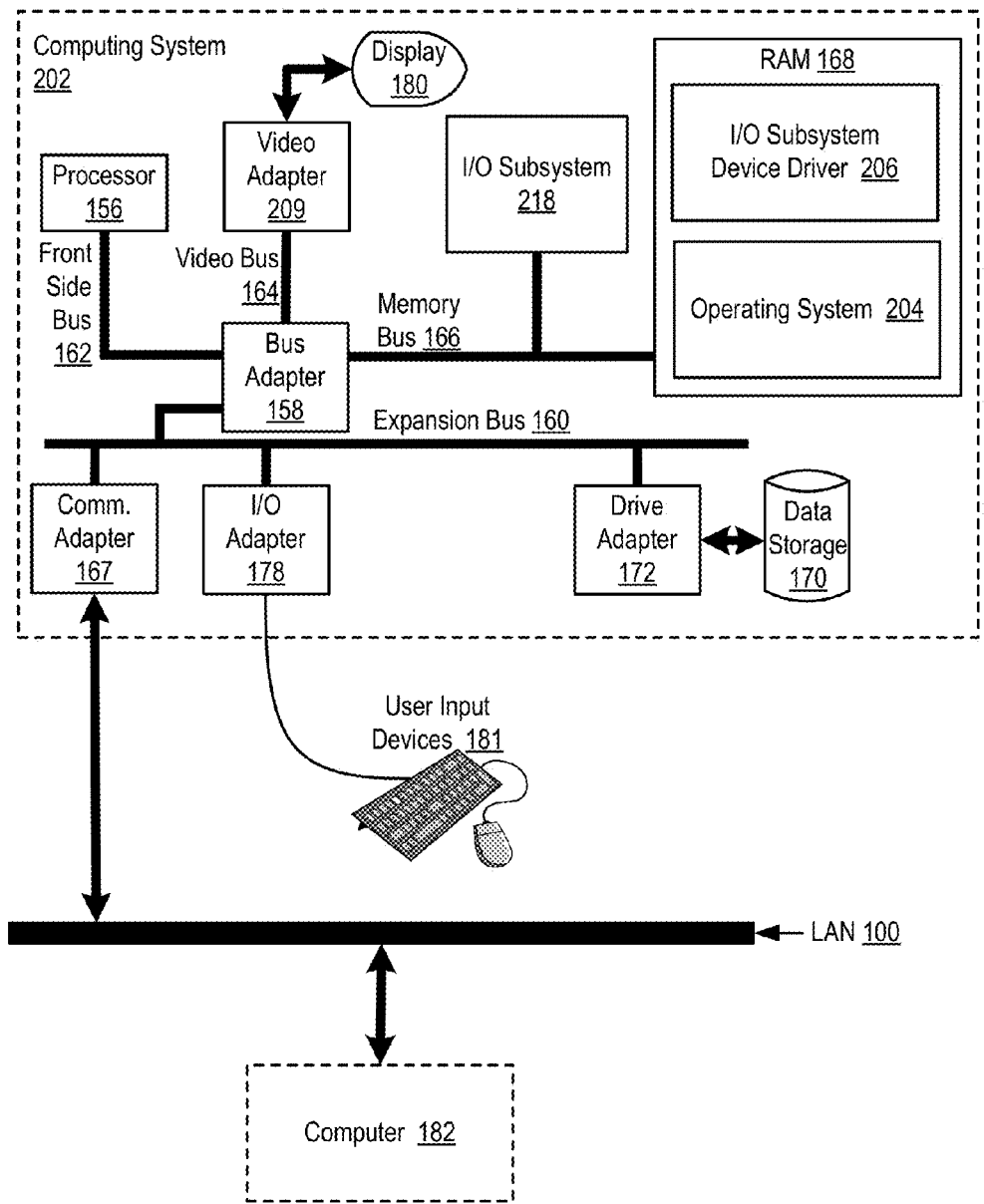

The I/O subsystem device driver (206) of FIG. 1 can further carry out I/O subsystem management by setting a predetermined memory address to a value indicating that the I/O subsystem (218) is not to service system requests. The predetermined memory address may be a specially designated location in computer memory for storing a value that identifies the operational state of the I/O subsystem (218). For example, the predetermined memory address may be a specially designated location in RAM (168). In such an example, the value contained in the predetermined memory address is used to determine the operational state of the I/O subsystem (218). For example, a value of '0' may indicate that the I/O subsystem (218) is not operational while a value of '1' may indicate that the I/O subsystem (218) is fully operational. The I/O subsystem (218) of FIG. 1 may be configured to check the value contained in the predetermined memory address to determine what state it is to operate in.

Consider the example described above in which the I/O subsystem (218) is a Flash DIMM. In such an example, prior to servicing a memory access request, the Flash DIMM may check the predetermined memory address to determine its operational state. If the Flash DIMM discovers that is to operate in an active state, the Flash DIMM may service the memory access request. If the Flash DIMM discovers that is to operate in an inactive state, the Flash DIMM may ignore the memory access request. In the example of FIG. 1, setting the predetermined memory address to a value indicating that the I/O subsystem (218) is not to service system requests may be carried out, for example, by writing the appropriate value to the predetermined memory address.

In the example of FIG. 1, after setting the predetermined memory address to a value indicating that the I/O subsystem (218) is not to service system requests, the I/O subsystem device driver (206) is prepared for the computing system (202) to enter into hibernation in response to the hibernation request. That is, from the perspective of the I/O subsystem device driver, all necessary steps have been taken to prepare the I/O subsystem (218) in anticipation of the entire computing system (202) entering hibernation.

The I/O subsystem device driver (206) of FIG. 1 can further carry out I/O subsystem management by detecting that the I/O subsystem device driver (206) has been restarted. The I/O subsystem device driver (206) may be restarted as the computing system (202) is resuming from hibernation. In the example of FIG. 1, detecting that the I/O subsystem device driver (206) has been restarted may be carried out by the computer program instructions that are included in the I/O subsystem device driver (206) being executed. That is, once the I/O subsystem device driver (206) is loaded and executing, the I/O subsystem device driver (206) has been restarted.

The I/O subsystem device driver (206) of FIG. 1 can further carry out I/O subsystem management by setting the predetermined memory address to a value indicating that the I/O subsystem (218) can resume servicing system requests. Setting the predetermined memory address to a value indicating that the I/O subsystem (218) can resume servicing system requests may be carried out, for example, by writing the appropriate value to the predetermined memory address. In such an example, the I/O subsystem (218) can resume servicing system requests after the value has been set. As described above, the computing system (202) needs the I/O subsystem device driver (206) to control the operation of the I/O subsystem (218). In the situation in which the computing system (202) is resuming from hibernation, however, until the I/O subsystem device driver (206) has been restarted, the computing system (202) may not properly interact with the I/O subsystem (218). By placing the I/O subsystem (218) in a state where it does not service requests prior to entering hibernation, and not changing the operation state of the I/O subsystem (218) until after the I/O subsystem device driver (206) has been restarted upon exiting hibernation, the I/O subsystem (218) can avoid being accessed improperly.

Consider the example described above in which the I/O subsystem (218) is a Flash DIMM. In such an example, the I/O subsystem device driver (206) is required to access the flash memory of the Flash DIMM over the memory bus (166) that is typically used to access RAM (168). As such, when the computing system (202) resumes from hibernation, all access requests that are sent to the Flash DIMM prior to the I/O subsystem device driver (206) being restarted should be ignored by the Flash DIMM, as these requests will resemble a memory access request directed to RAM. Stated differently, until the I/O subsystem device driver (206) is restarted the operating system (204) may not know that the Flash DIMM is actually Flash DIMM and not standard RAM (168).

Also stored in RAM (168) is an operating system (204). Operating systems useful memory bus attached I/O subsystem management in a computing system (202) according to embodiments of the present invention include UNIX™, Linux™, Microsoft XP™, AIX™, IBM's i5/OS™, and others as will occur to those of skill in the art. The operating system (204) and the I/O subsystem device driver (206) in the example of FIG. 1 are shown in RAM (168), but many components of such software typically are stored in non-volatile memory also, such as, for example, on a disk drive (170).

The computing system (202) of FIG. 1 includes disk drive adapter (172) coupled through expansion bus (160) and bus adapter (158) to processor (156) and other components of the computing system (202). Disk drive adapter (172) connects non-volatile data storage to the computing system (202) in the form of disk drive (170). Disk drive adapters useful in computers for memory bus attached I/O subsystem management in a computing system (202) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (202) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (202) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computing system (202) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for memory bus attached I/O subsystem management in a computing system (202) according to embodiments of the present invention include modems for wired dial-up communications, Ethernet (IEEE 802.3) adapters for wired data communications network communications, and 802.11 adapters for wireless data communications network communications.

Figure 2:
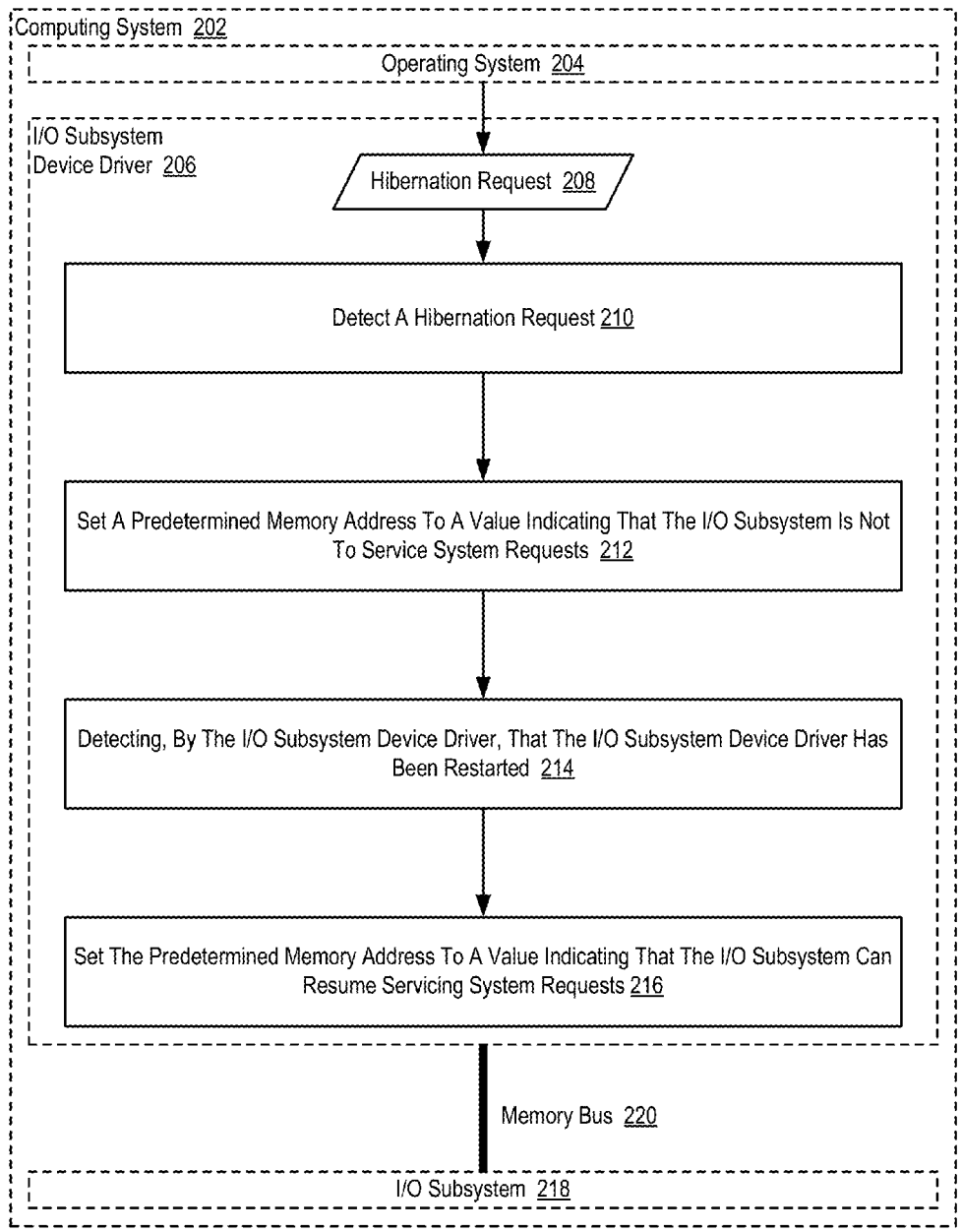

For further explanation, FIG. 2 sets forth a flow chart illustrating an example method for memory bus attached I/O subsystem management in a computing system (202) according to embodiments of the present invention. The computing system (202) of FIG. 2 includes an I/O subsystem (218) that is communicatively coupled to a memory bus (220). In the example method of FIG. 2, the I/O subsystem (218) may be embodied, for example, as a Flash DIMM. Flash DIMM, as the term is used here, refers to flash memory that takes the form factor of a DIMM, such that the Flash DIMM may be inserted in a DIMM slot and may communicate with the computer processor over a memory bus that is typically used to connect the computer processor to main memory.

The example method of FIG. 2 also includes an I/O subsystem device driver (206). In the example method of FIG. 2, the I/O subsystem device driver (206) is a computer program that controls a particular type of device that is attached to the computing system (202). In particular, the I/O subsystem device driver (206) of FIG. 2 controls the I/O subsystem (218). Consider the example with the I/O subsystem (218) is a Flash DIMM. In such an example, the DIMM includes flash memory that is addressed and accessed in a different way than RAM. The Flash DIMM, however, is inserted into a DIMM slot and is connected to the memory bus (220) as if the Flash DIMM were RAM. In order to access the flash memory on such a Flash DIMM, a special purpose device driver would be needed that can communicate with flash memory over the memory bus (220) that connects a processor to main memory.

The example method of FIG. 2 includes detecting (210), by an I/O subsystem device driver (206), a hibernation request (208). In the example method of FIG. 2, a hibernation request (208) represents a command issued by the operating system (204) to place the computing system (202) into hibernation. Hibernation, as the term is used here, is a state in which the computing system (202) is powered down while having its state retained. When entering into hibernation, the contents of main memory are typically stored into hard disk, so that the state of the computing system (202) can be restored when the computing system (202) resumes operation in a powered-up state. In the example method of FIG. 2, detecting (210) a hibernation request (208) may be carried out, for example, by the I/O subsystem device driver (206) receiving the request (208) from the operating system (204), by the I/O subsystem device driver (206) listening for the request (208) over a communications channel, and in other ways as will occur to those of skill in the art.

The example method of FIG. 2 also includes setting (212), by the I/O subsystem device driver (206), a predetermined memory address to a value indicating that the I/O subsystem (218) is not to service system requests. In the example method of FIG. 2, the predetermined memory address may be a specially designated location in computer memory for storing a value that identifies the operational state of the I/O subsystem (218). For example, the predetermined memory address may be a specially designated location in RAM. In such an example, the value contained in the predetermined memory address is used to determine the operational state of the I/O subsystem (218). For example, a value of '0' may indicate that the I/O subsystem (218) is not operational while a value of '1' may indicate that the I/O subsystem (218) is fully operational. The I/O subsystem (218) of FIG. 2 may be configured to check the value contained in the predetermined memory address to determine what state it is to operate in.

Consider the example described above in which the I/O subsystem (218) is a Flash DIMM. In such an example, prior to servicing a memory access request, the Flash DIMM may check the predetermined memory address to determine its operational state. If the Flash DIMM discovers that is to operate in an active state, the Flash DIMM may service the memory access request. If the Flash DIMM discovers that is to operate in an inactive state, the Flash DIMM may ignore the memory access request. In the example method of FIG. 2, setting (212) the predetermined memory address to a value indicating that the I/O subsystem (218) is not to service system requests may be carried out, for example, by writing the appropriate value to the predetermined memory address.

In the example method of FIG. 2, after setting (212) the predetermined memory address to a value indicating that the I/O subsystem (218) is not to service system requests, the I/O subsystem device driver (206) is prepared for the computing system (202) to enter into hibernation in response to the hibernation request (208). That is, from the perspective of the I/O subsystem device driver (206), all necessary steps have been taken to prepare the I/O subsystem (218) in anticipation of the entire computing system (202) entering hibernation.

The example method of FIG. 2 also includes detecting (214), by the I/O subsystem device driver (206), that the I/O subsystem device driver (206) has been restarted. In the example method of FIG. 2, the I/O subsystem device driver (206) may be restarted as the computing system (202) is resuming from hibernation. In the example method of FIG. 2, detecting (214) that the I/O subsystem device driver (206) has been restarted may be carried out by the computer program instructions that are included in the I/O subsystem device driver (206) being executed. That is, once the I/O subsystem device driver (206) is loaded and executing, the I/O subsystem device driver (206) has been restarted.

The example method of FIG. 2 also includes setting (216), by the I/O subsystem device driver (206), the predetermined memory address to a value indicating that the I/O subsystem (218) can resume servicing system requests. In the example method of FIG. 2, setting (216) the predetermined memory address to a value indicating that the I/O subsystem (218) can resume servicing system requests may be carried out, for example, by writing the appropriate value to the predetermined memory address. In such an example, the I/O subsystem (218) can resume servicing system requests after the value has been set (216). As described above, the computing system (202) needs the I/O subsystem device driver (206) to control the operation of the I/O subsystem (218). In the situation in which the computing system (202) is resuming from hibernation, however, until the I/O subsystem device driver (206) has been restarted, the computing system (202) may not properly interact with the I/O subsystem (218). By placing the I/O subsystem (218) in a state where it does not service requests prior to entering hibernation, and not changing the operation state of the I/O subsystem (218) until after the I/O subsystem device driver (206) has been restarted upon exiting hibernation, the I/O subsystem (218) can avoid being accessed improperly.

Consider the example described above in which the I/O subsystem (218) is a Flash DIMM. In such an example, the I/O subsystem device driver (206) is required to access the flash memory of the Flash DIMM over a memory bus (220) that is typically used to access RAM. As such, when the computing system (202) resumes from hibernation, all access requests that are sent to the Flash DIMM prior to the I/O subsystem device driver (206) being restarted should be ignored by the Flash DIMM, as these requests will resemble a memory access request directed to RAM. Stated differently, until the I/O subsystem device driver (206) is restarted the operating system (204) may not know that the Flash DIMM is actually Flash DIMM and not standard RAM.

Figure 3:
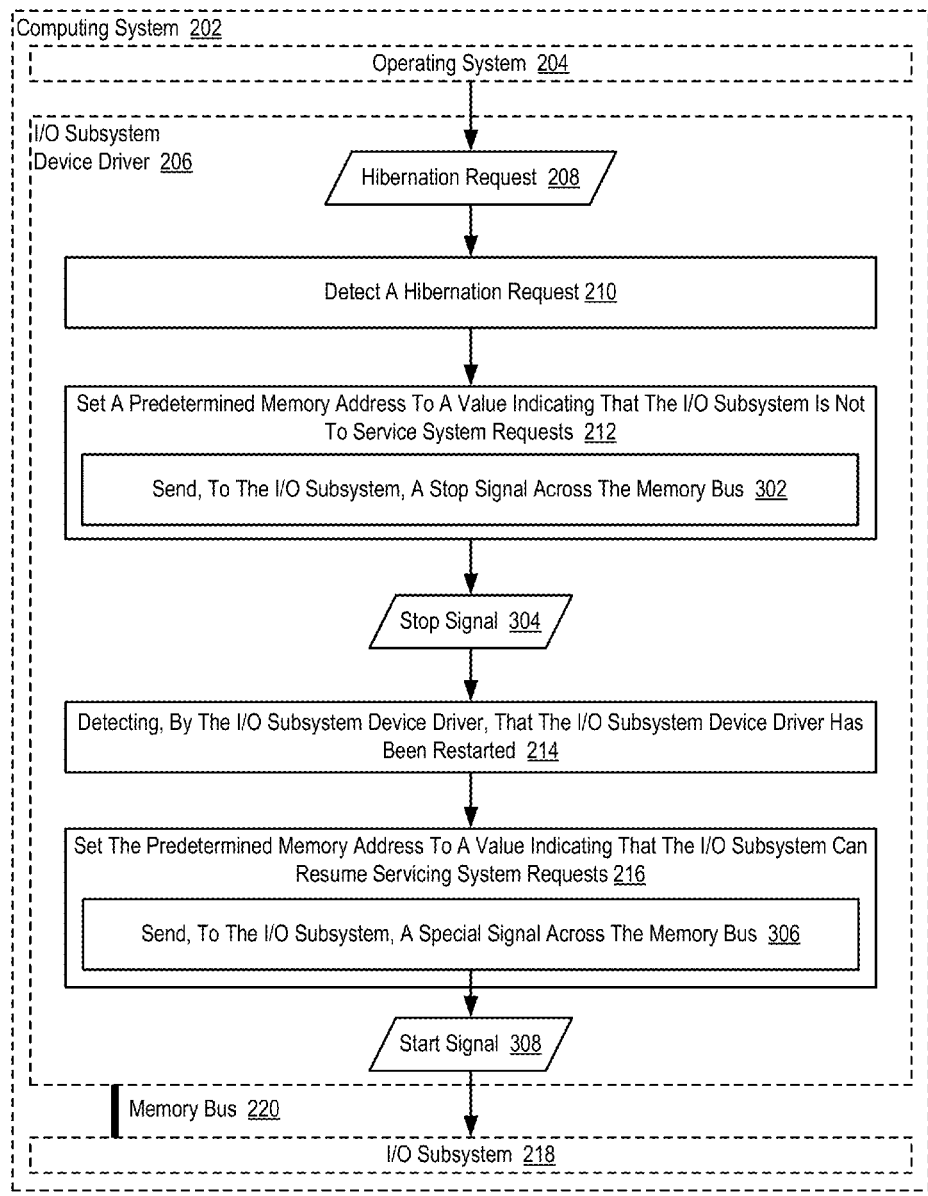

For further explanation, FIG. 3 sets forth a flow chart illustrating an example method for memory bus attached I/O subsystem management in a computing system (202) according to embodiments of the present invention. The example method of FIG. 3 is similar to the example method of FIG. 2, as it also includes detecting (210) a hibernation request (208), setting (212) a predetermined memory address to a value indicating that the I/O subsystem (218) is not to service system requests, detecting (214) that the I/O subsystem device driver (206) has been restarted, and setting (216) the predetermined memory address to a value indicating that the I/O subsystem (218) can resume servicing system requests.

In the example method of FIG. 3, setting (212) a predetermined memory address to the value indicating that the I/O subsystem (218) is not to service system requests can include sending (302), by the I/O subsystem device driver (206) to the I/O subsystem (218), a stop signal (304) across the memory bus (220). In the example method of FIG. 3, the stop signal (304) may be embodied as a special sequence of bits that the I/O subsystem (218) is configured to read as an instruction to enter into an inactive mode in which the I/O subsystem (218) is not to service any requests. In such an example, the I/O subsystem device driver (206) may place this predetermined, special sequence of bits on the memory bus (220), such that when the special sequence of bits are received by the I/O subsystem (218), the I/O subsystem (218) causes the predetermined memory address to be set (212) to the value indicating that the I/O subsystem (218) is not to service system requests.

In the example method of FIG. 3, setting (216) the predetermined memory address to the value indicating that the I/O subsystem (218) can resume servicing system requests can include sending (306), by the I/O subsystem device driver (206) to the I/O subsystem (218), a start signal (308) across the memory bus (220). In the example method of FIG. 3, the start signal (308) may be embodied as a special sequence of bits that the I/O subsystem (218) is configured to read as an instruction to enter into an active mode in which the I/O subsystem (218) is to service requests. In such an example, the I/O subsystem device driver (206) may place this predetermined, special sequence of bits on the memory bus (220), such that when the special sequence of bits are received by the I/O subsystem (218), the I/O subsystem (218) causes the predetermined memory address to be set (216) to the value indicating that the I/O subsystem (218) can resume servicing system requests.

Figure 4:
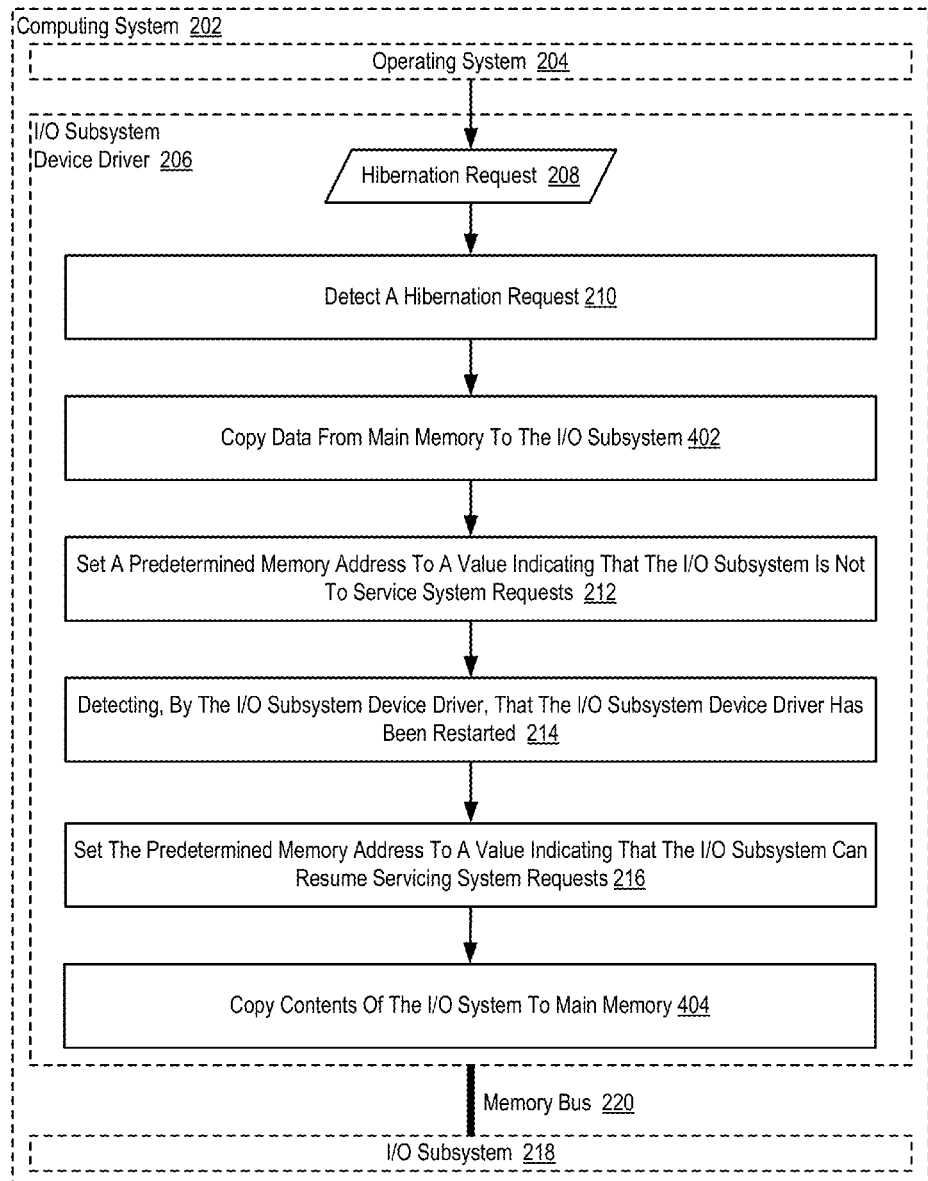

For further explanation, FIG. 4 sets forth a flow chart illustrating an example method for memory bus attached I/O subsystem management in a computing system (202) according to embodiments of the present invention. The example method of FIG. 4 is similar to the example method of FIG. 2, as it also includes detecting (210) a hibernation request (208), setting (212) a predetermined memory address to a value indicating that the I/O subsystem (218) is not to service system requests, detecting (214) that the I/O subsystem device driver (206) has been restarted, and setting (216) the predetermined memory address to a value indicating that the I/O subsystem (218) can resume servicing system requests.

The example method of FIG. 4 also includes copying (402), by the I/O subsystem device driver (206), data from main memory to the I/O subsystem (218). As described above, the I/O subsystem (218) may be embodied as a Flash DIMM. In such an example, the Flash DIMM may be the only form of nonvolatile computer memory in the computing system (202). As such, in order to enter into hibernation the computing system (202) may need to copy the entire contents of main memory into the Flash DIMM prior to entering hibernation. Because the Flash DIMM can only be accessed appropriately through the use of the I/O subsystem device driver (206), the I/O subsystem device driver (206) may therefore be responsible for copying (402) data from main memory to the I/O subsystem (218) as part of the process of entering hibernation.

The example method of FIG. 4 also includes copying (404), by the I/O subsystem device driver (206), contents of the I/O subsystem (218) to main memory. In the example method of FIG. 4, copying (404), by the I/O subsystem device driver (206), contents of the I/O subsystem (218) to main memory is carried out in response to setting (216) the predetermined memory address to the value indicating that the I/O subsystem (218) can resume servicing system requests. Continuing the example described above in which the I/O subsystem (218) is embodied as a Flash DIMM and where the Flash DIMM is the only form of nonvolatile computer memory in the computing system (202), a computing system (202) exiting hibernation must be resumed by restoring data that was previously contained in main memory. Because the Flash DIMM can only be accessed appropriately through the use of the I/O subsystem device driver (206), the I/O subsystem device driver (206) may therefore be responsible for copying (404) contents of the I/O subsystem (218) to main memory as part of the process of exiting hibernation.

Figure 5:
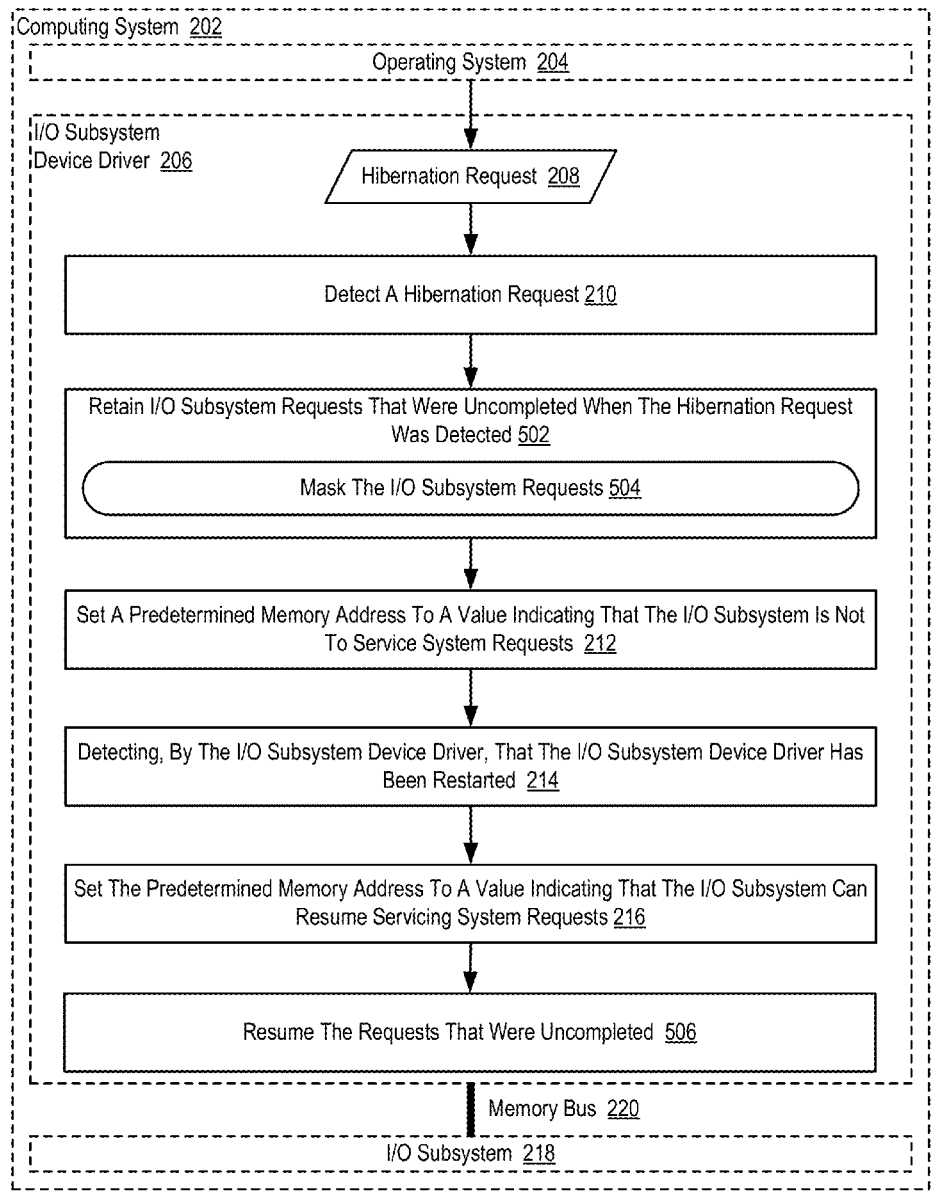

For further explanation, FIG. 5 sets forth a flow chart illustrating an example method for memory bus attached I/O subsystem management in a computing system (202) according to embodiments of the present invention. The example method of FIG. 5 is similar to the example method of FIG. 2, as it also includes detecting (210) a hibernation request (208), setting (212) a predetermined memory address to a value indicating that the I/O subsystem (218) is not to service system requests, detecting (214) that the I/O subsystem device driver (206) has been restarted, and setting (216) the predetermined memory address to a value indicating that the I/O subsystem (218) can resume servicing system requests.

The example method of FIG. 5 also includes retaining (502), by the I/O subsystem device driver (206) in nonvolatile memory, I/O subsystem requests that were uncompleted when the hibernation request (208) was detected (210). In the example method of FIG. 5, retaining (502) I/O subsystem requests that were uncompleted when the hibernation request (208) was detected (210) may be carried out by writing such requests to nonvolatile memory as part of the process of entering hibernation.

In the example method of FIG. 5, retaining (502), in nonvolatile memory, I/O subsystem requests that were uncompleted when the hibernation request (208) was detected (210) can include masking (504) the I/O subsystem requests. In the example method of FIG. 5, masking (504) the I/O subsystem requests includes altering the data in a known way so that the data may be recovered later by undoing the masking operation. In the example method of FIG. 5, masking (504) the I/O subsystem requests may be carried out, for example, by bit-reversing the I/O subsystem requests. In such an example, masking (504) the I/O subsystem requests ensures that the I/O subsystem requests will not be executed prematurely as the masking changes the format of the command from a format that is acceptable to some other format.

The example method of FIG. 5 also includes resuming (506), by the I/O subsystem device driver (206), the requests that were uncompleted. In the example method of FIG. 5, resuming (506) the requests that were uncompleted may be carried out when the computing system (202) fully resumes from hibernation. In such an example, the I/O subsystem requests that were uncompleted when the hibernation request (208) was detected (210) may be placed by in the instruction pipeline for execution. In such a way, the I/O subsystem device driver (206) may reconstruct the I/O subsystem requests once the I/O subsystem device driver (206) has fully resumed and can restart execution of the I/O subsystem requests that were uncompleted when the hibernation request (208) was detected (210).

Example embodiments of the present invention are described largely in the context of a fully functional computer system for memory bus attached I/O subsystem management. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of memory bus attached Input/Output ('I/O') subsystem management in a computing system, the computing system including an I/O subsystem communicatively coupled to a memory bus, the method comprising:
    detecting, by an I/O subsystem device driver, a hibernation request;
    responsive to detecting the hibernation request, setting, by the I/O subsystem device driver, a predetermined memory address to a value indicating that the I/O subsystem is not to service system requests;
    detecting, by the I/O subsystem device driver, that the I/O subsystem device driver has been restarted; and
    setting, by the I/O subsystem device driver, the predetermined memory address to a value indicating that the I/O subsystem can resume servicing system requests.

2. The method of claim 1 wherein setting, by the I/O subsystem device driver, a predetermined memory address to the value indicating that the I/O subsystem is not to service system requests further comprises sending, by the I/O subsystem device driver to the I/O subsystem, a stop signal across the memory bus.

3. The method of claim 1 wherein setting, by the I/O subsystem device driver, the predetermined memory address to the value indicating that the I/O subsystem can resume servicing system requests further comprises sending, by the I/O subsystem device driver to the I/O subsystem, a start signal across the memory bus.

4. The method of claim 1 further comprising:
    copying, by the I/O subsystem device driver, data from main memory to the I/O subsystem; and
    responsive to setting the predetermined memory address to the value indicating that the I/O subsystem can resume servicing system requests, copying, by the I/O subsystem device driver, contents of the I/O subsystem to main memory.

5. The method of claim 1 wherein the I/O subsystem is dual in-line memory module ('DIMM') form factor flash memory.

6. The method of claim 1 further comprising:
    retaining, by the I/O subsystem device driver in nonvolatile memory, I/O subsystem requests that were uncompleted when the hibernation request was detected; and
    resuming, by the I/O subsystem device driver, the requests that were uncompleted.

7. The method of claim 6 wherein retaining I/O subsystem requests that were uncompleted when the hibernation request was detected includes masking the I/O subsystem requests.

* * * * *